(12) United States Patent
Trunnell et al.

(10) Patent No.: US 8,132,537 B2
(45) Date of Patent: Mar. 13, 2012

(54) MULTI-COMPARTMENT PET TRAINING SYSTEM

(76) Inventors: Douglas P. Trunnell, Waterloo, IA (US); Becky L. Trunnell, Waterloo, IA (US)

( * ) Notice: Subject to any disclaimer, the term of this patent is extended or adjusted under 35 U.S.C. 154(b) by 270 days.

(21) Appl. No.: 12/399,611

(22) Filed: Mar. 6, 2009

(65) Prior Publication Data
US 2009/0223461 A1    Sep. 10, 2009

Related U.S. Application Data

(60) Provisional application No. 61/034,792, filed on Mar. 7, 2008, provisional application No. 61/089,162, filed on Aug. 15, 2008.

(51) Int. Cl.
*A01K 1/03* (2006.01)
(52) U.S. Cl. ...................................................... 119/496
(58) Field of Classification Search .................. 119/416, 119/452, 453, 482, 496, 497, 501, 455, 472, 119/473, 479
See application file for complete search history.

(56) References Cited

U.S. PATENT DOCUMENTS

| | | | |
|---|---|---|---|
| 894,638 A * | 7/1908 | Heim | 220/4.29 |
| 2,079,458 A * | 5/1937 | Leichtfuss | 220/7 |
| 3,885,523 A | 5/1975 | Coleman | |
| 3,954,086 A | 5/1976 | Maness | |
| 5,092,270 A * | 3/1992 | Simons et al. | 119/453 |
| 5,349,924 A | 9/1994 | Hooper, Jr. | |
| 5,471,950 A * | 12/1995 | White | 119/497 |
| 5,503,107 A * | 4/1996 | Satcher et al. | 119/496 |
| 6,427,631 B1 * | 8/2002 | Ross | 119/496 |
| 7,036,458 B1 * | 5/2006 | Stornant | 119/496 |
| 7,487,744 B1 * | 2/2009 | Goldberg et al. | 119/453 |
| 7,523,719 B2 * | 4/2009 | Miller et al. | 119/496 |
| 2002/0092477 A1 | 7/2002 | Ross | |

* cited by examiner

*Primary Examiner* — Peter Poon
*Assistant Examiner* — Kristen Hayes
(74) *Attorney, Agent, or Firm* — Boyle Fredrickson, S.C.

(57) ABSTRACT

A multi-compartment pet training system includes a front compartment joined to a rear compartment to define a passage therebetween such that the pet may move freely between the front compartment and the rear compartment. The front compartment includes a front door for ingress and egress of the pet between a surrounding area and the front compartment. The front compartment provides an area in which the pet may eat, drink and sleep. The rear compartment is configured to allow the pet to carry out urinary and/or fecal elimination while its owner is away. As such, the pet may be trained to utilize the rear compartment for carrying out waste elimination activities while utilizing the front compartment for all other activities.

13 Claims, 10 Drawing Sheets

MULTI-COMPARTMENT PET TRAINING SYSTEM

CROSS REFERENCE TO RELATED APPLICATIONS

The present application claims the benefit of U.S. Ser. No. 61/034,792, filed Mar. 7, 2008 and U.S. Ser. No. 61/089,162, filed Aug. 15, 2008, the entire disclosures of which are incorporated herein by reference.

BACKGROUND OF THE INVENTION

This invention relates to a pet training system, and more particularly to a pet training system having multiple compartments to allow the pet to utilize one of the compartments for urinary and fecal elimination.

It is well known that housebreaking a pet is one of the greater challenges facing pet owners. One common problem facing pet owners is preventing the pet from soiling their home and/or belongings while the owner is away. Pets typically dislike residing in an area that has been soiled. As such, many pet owners house their pets in restrictive crates so that the pet will not urinate or defecate in or otherwise soil the owner's home while they are away. However, crating the pet requires the pet to avoid urination and fecal elimination for long periods of time, which may be distressing for a pet. Alternatively, the owner may coordinate his or her schedule such that the pet may be let out during the day at regular intervals. This method of housebreaking is often inconvenient for the owner, and requires the owner to spend a great deal of time as well as costs associated with traveling home to let the pet out of the crate. Alternatively, the owner may hire a dog walker or other such person to let the pet out of its crate during the course of the day, which can be rather expensive.

Thus, a pet training system that is relatively inexpensive, convenient, and prevents the pet from causing damage to the owner's home and/or belongings is desired.

SUMMARY OF THE INVENTION

The multi-compartment pet training system according to the present invention includes a front compartment and a rear compartment defining interiors therein. The front compartment includes a front door, and an intermediate passage arrangement is provided between the front compartment and the rear compartment to thereby define a passageway from the interior of the front compartment to the interior of the rear compartment. The front compartment of the pet training system of the present invention is adapted to serve as a sleeping and/or eating area, and the rear compartment is configured to serve as a urinary and fecal waste elimination area for the pet housed in the multi-compartment pet training system.

The front compartment of the pet training system includes a pair of sides having a number of apertures therethrough for providing ventilation thereto. The front door of the pet training system may be hingedly coupled to the front compartment to allow a user to selectively access the interior of the front compartment for cleaning and/or maintenance and for selectively allowing ingress and egress of the pet between the pet training system and the outside environment, e.g., the owner's house or other living area. The front compartment may additionally include a top door for selectively accessing the interior thereof. The top and front doors may be apertured or may have a generally solid construction.

The rear compartment of the pet training system is generally solid. The rear compartment may include a rear door and/or a top door for accessing the interior thereof. The sides of the rear compartment are preferably completely solid so as to prevent odors from emanating therefrom.

The front compartment and the rear compartment of the pet training system are preferably constructed of a top shell and a bottom shell configured to be joined together.

In another embodiment of the multi-compartment pet training system according to the present invention, the rear compartment is removably attached to the front compartment such that the system may be configured to include a single compartment.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
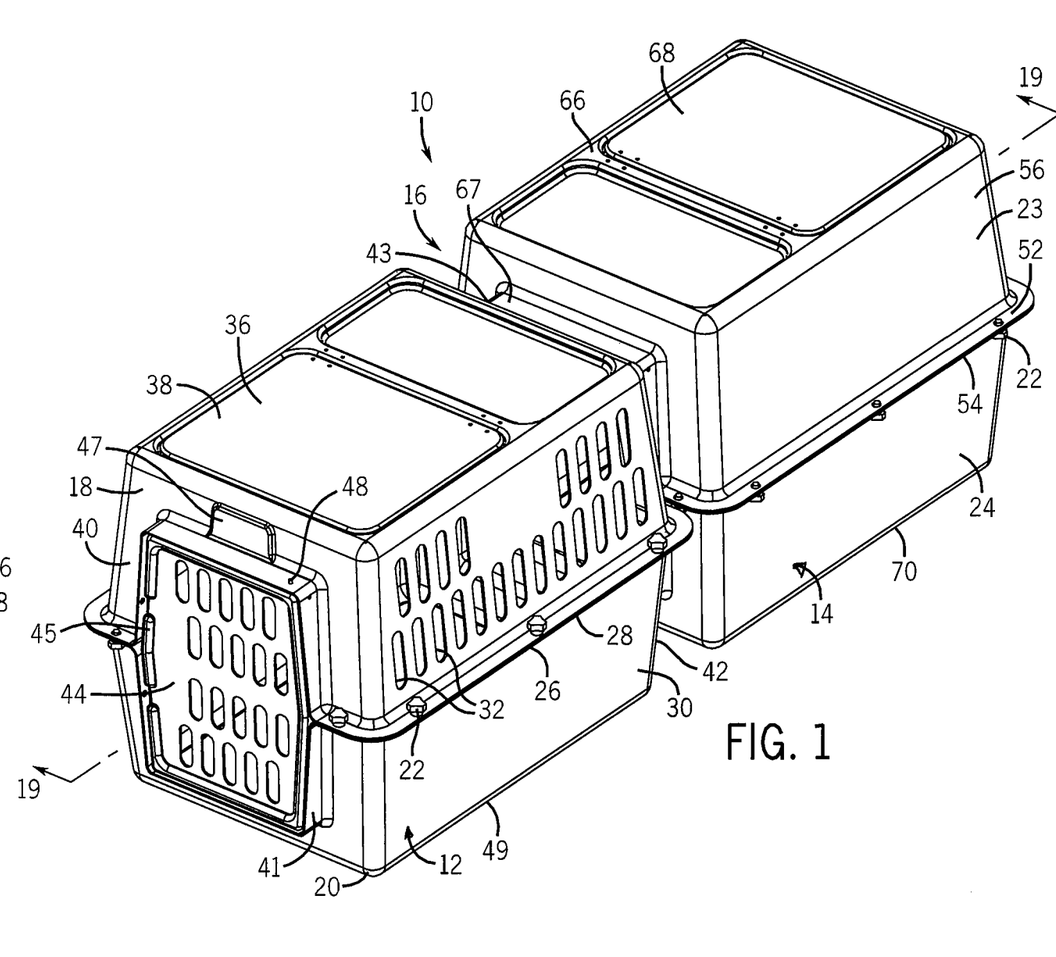
FIG. 1 is a perspective view of pet training system according to the present invention.
Figure 2:
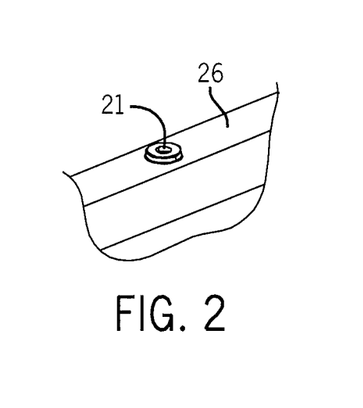
FIG. 2 is a partial cross-section showing a fastener coupling a top shell to a bottom shell of a rear compartment of the pet training system, the cross-section taken along line 2-2 of FIG. 4.
Figure 3:
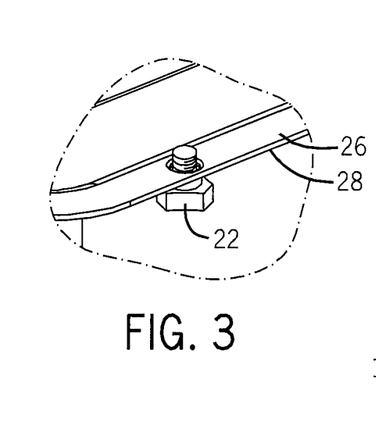
FIG. 3 is a partial cross-section showing an alternative fastener coupling the top shell to the bottom shell of the rear compartment of the pet training system, the cross-section taken along line 3-3 of FIG. 4.
Figure 4:
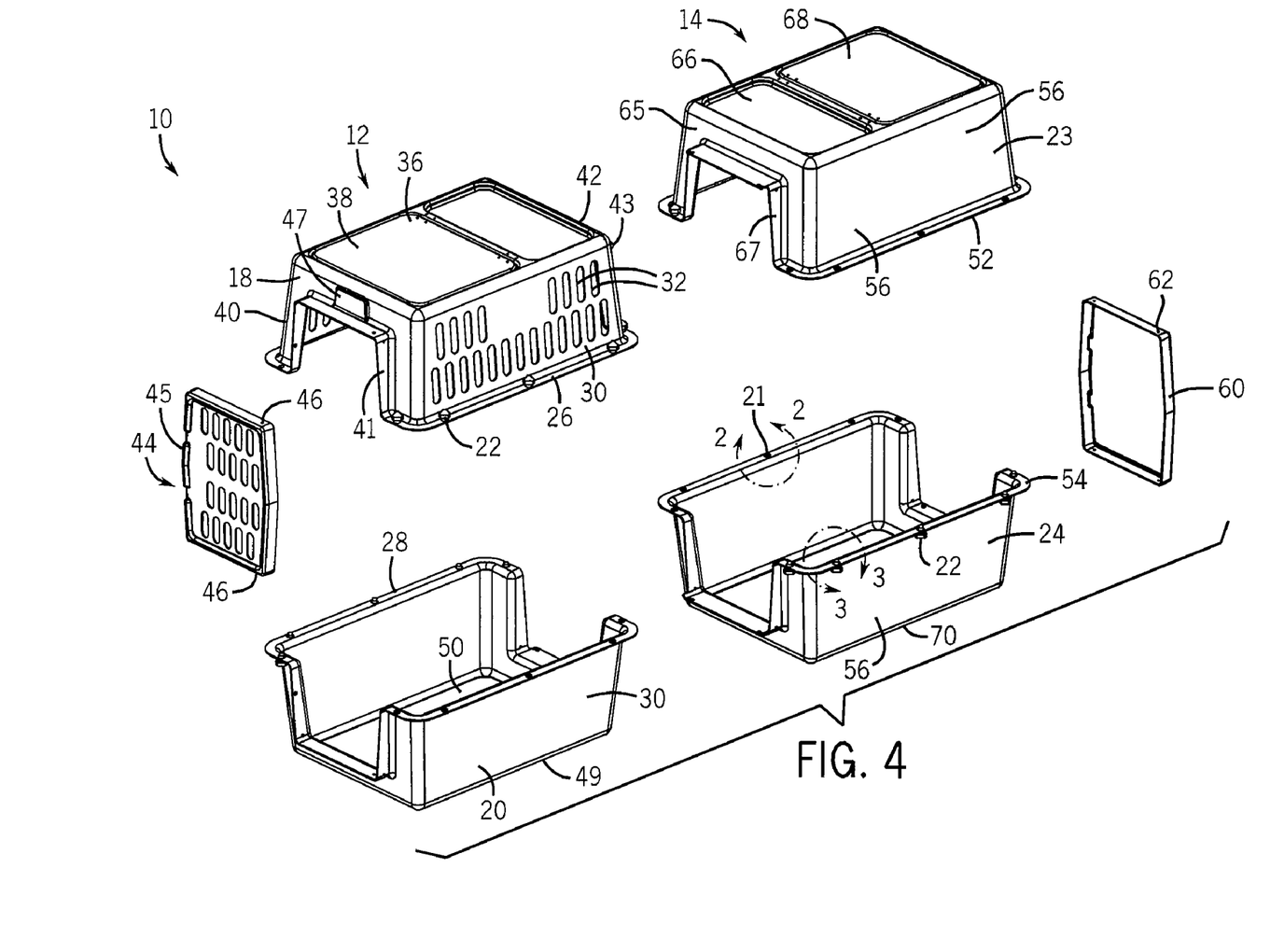
FIG. 4 is an exploded perspective view of the pet training system of the present invention.
Figures 5, 6, 7:
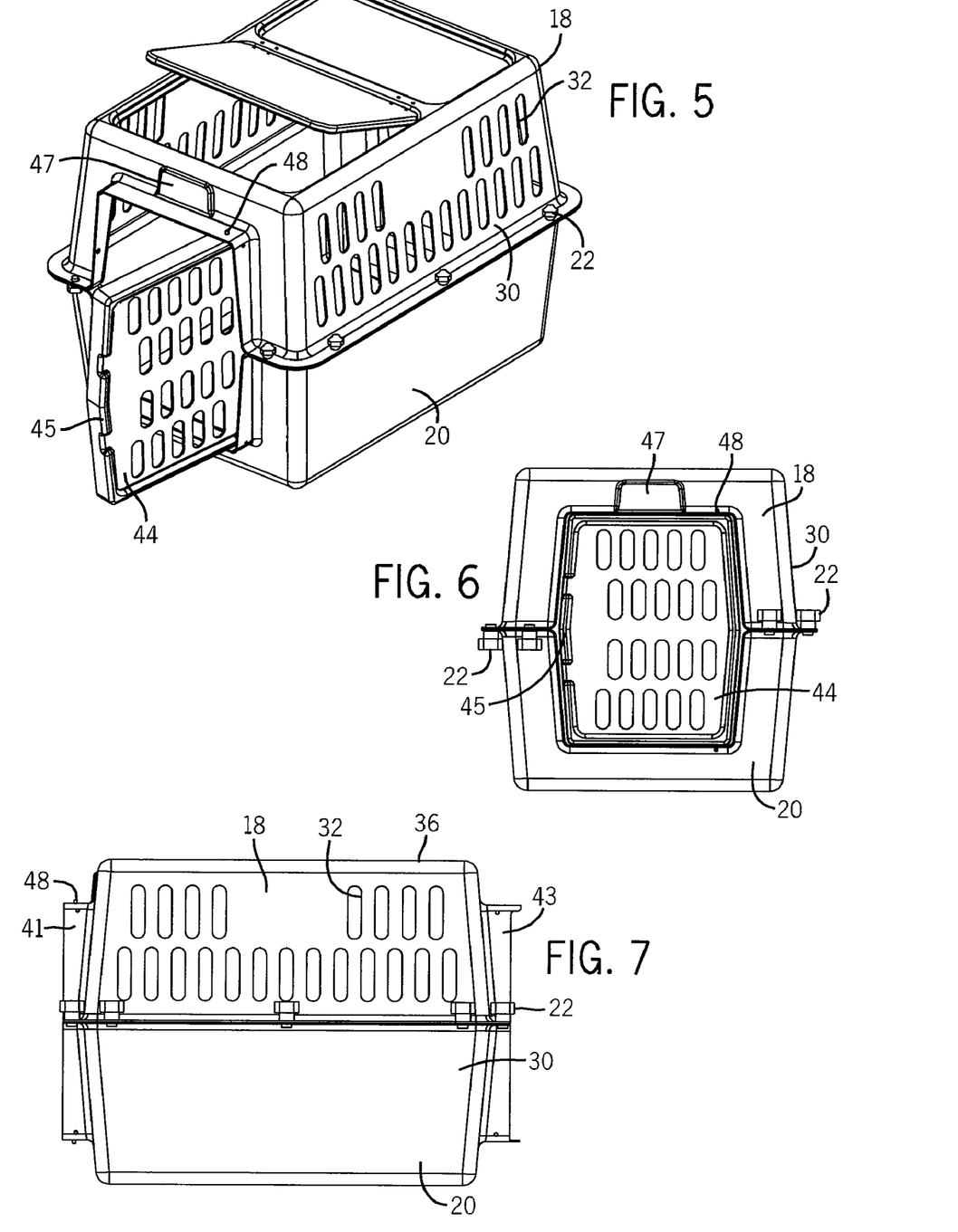
FIG. 5 is a perspective view of a front compartment of the pet training system of the present invention.
FIG. 6 is a front elevation view of the front compartment of the pet training system of the present invention.
FIG. 7 is a side elevation view of the front compartment of the pet training system of the present invention.
Figure 8:
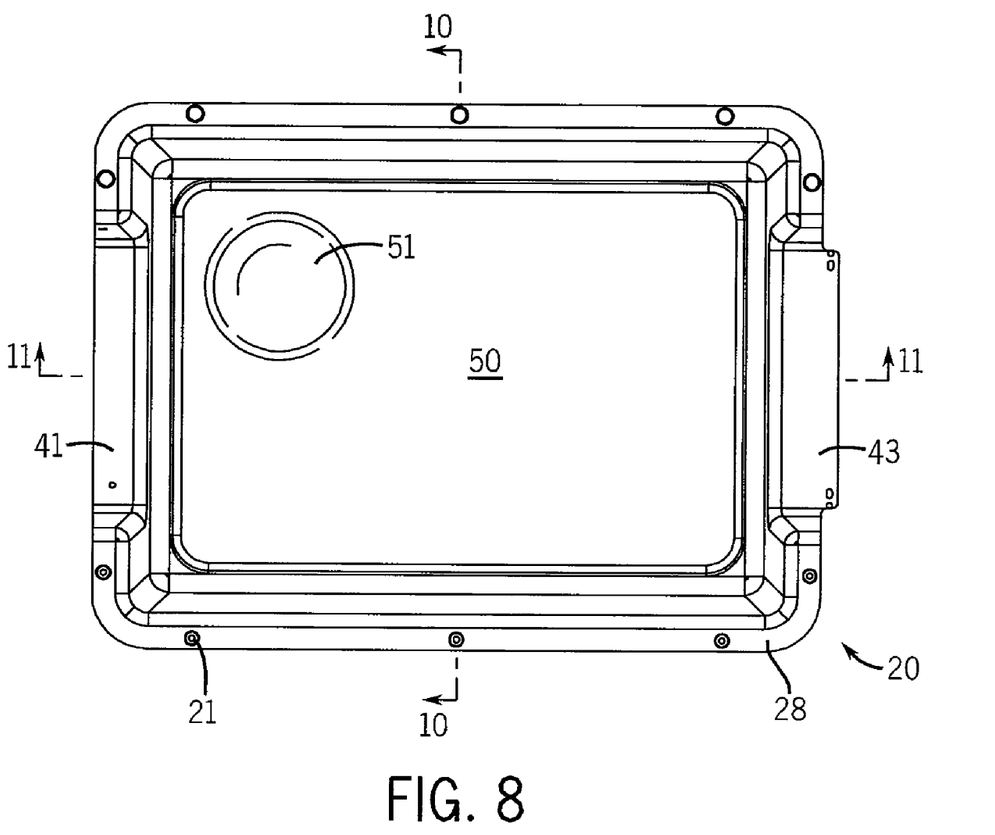
FIG. 8 is a top plan view of a lower shell of the front compartment of the pet training system of the present invention.
Figure 9:
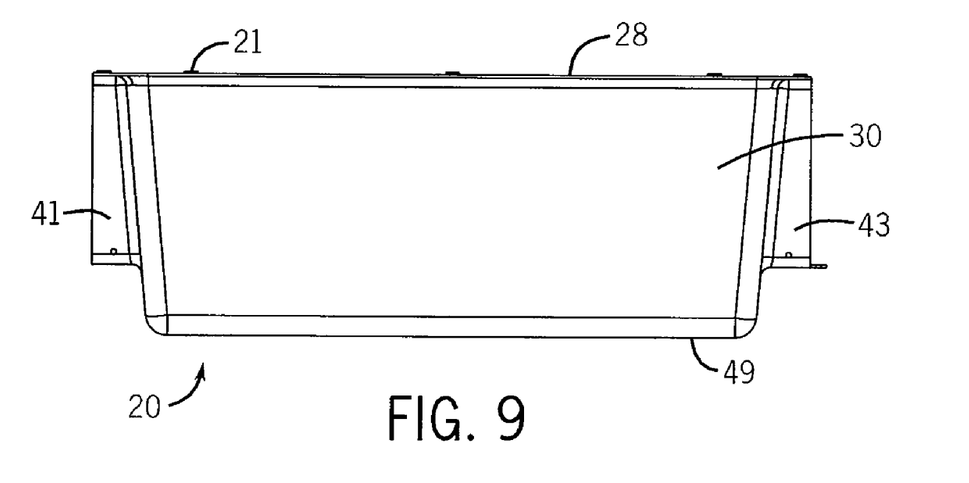
FIG. 9 is a side elevation view of the lower shell of the front compartment of the pet training system of the present invention.
Figure 10:
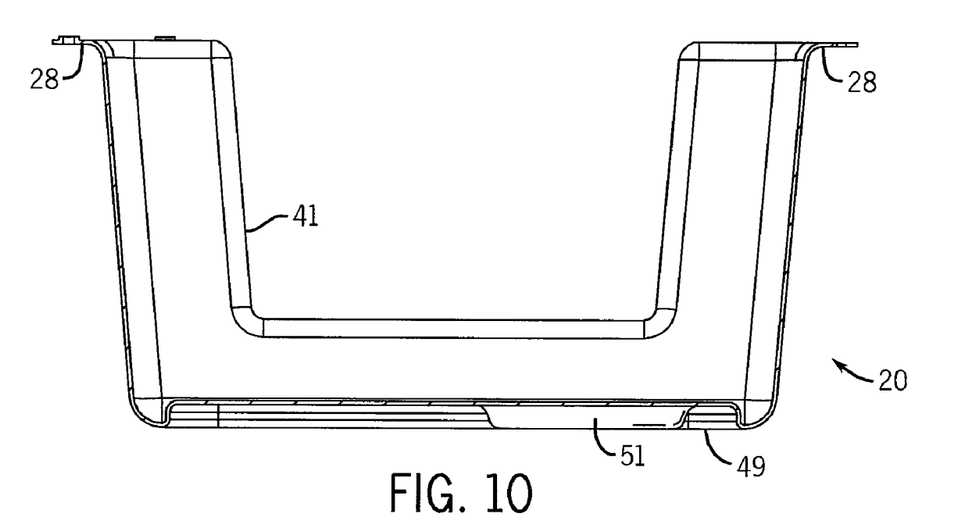
FIG. 10 is a cross section view taken along line 10-10 of FIG. 8 of the lower shell of the front compartment of the pet training system of the present invention.
Figure 11:
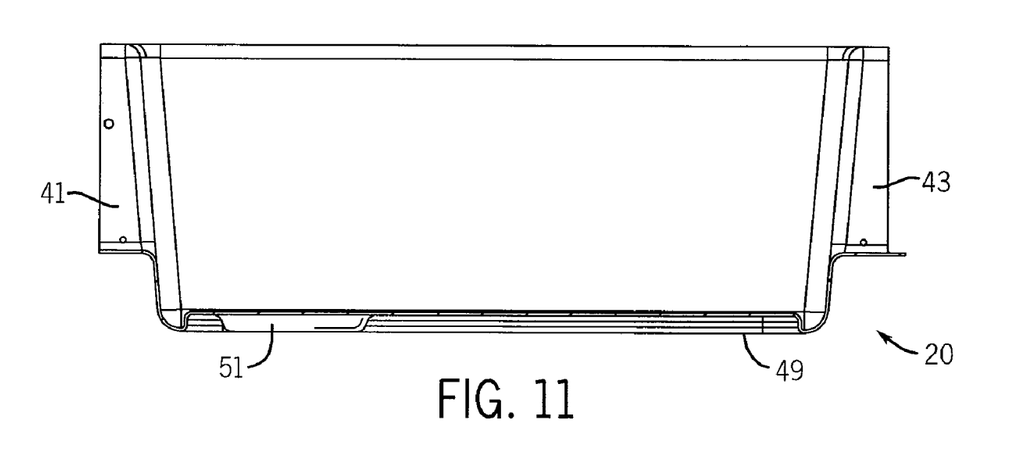
FIG. 11 is a cross section taken along line 11-11 of FIG. 8 of the lower shell of the front compartment of the pet training system of the present invention.
Figure 12:
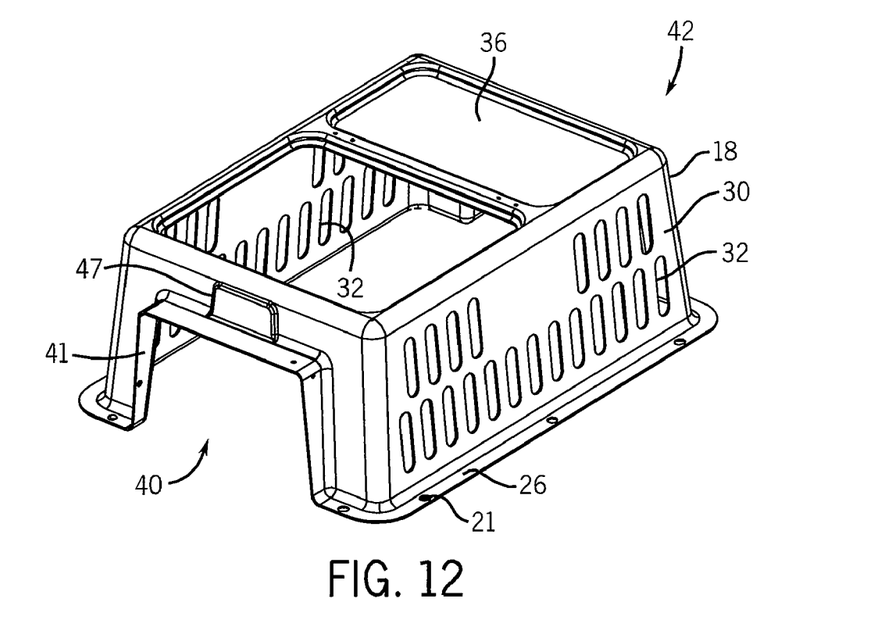
FIG. 12 is a perspective view of an upper shell of a front compartment of the pet training system of the present invention showing a top door removed therefrom.
Figure 13:
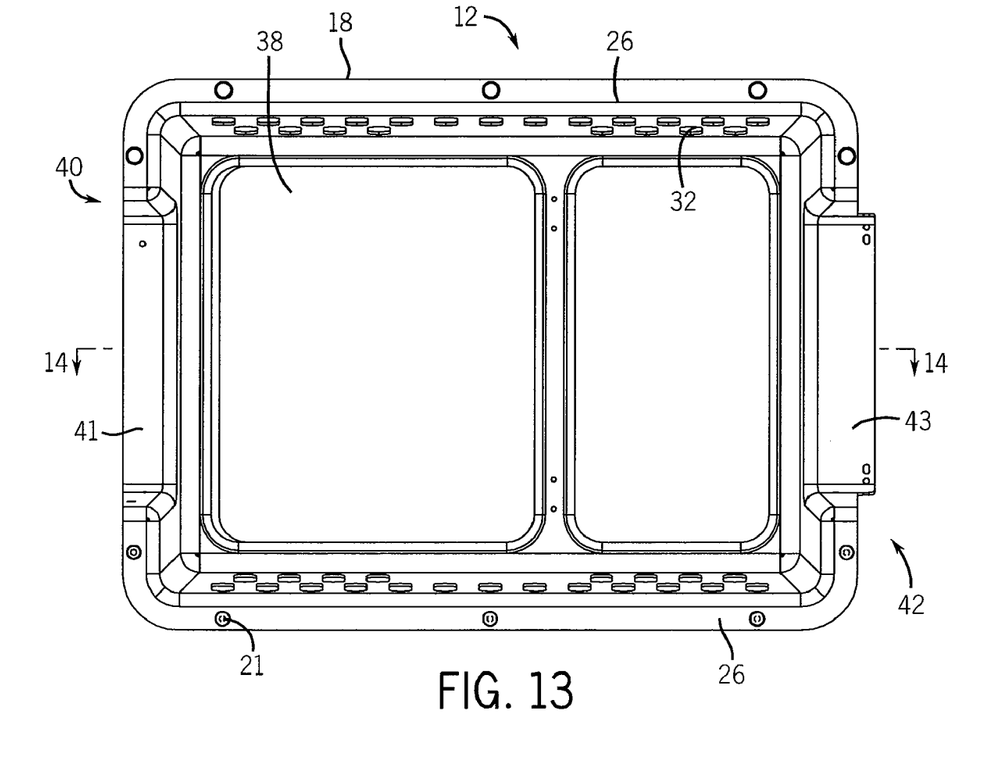
FIG. 13 is a bottom plan view of an interior of the top shell of the front compartment of the pet training system of the present invention.
Figure 14:
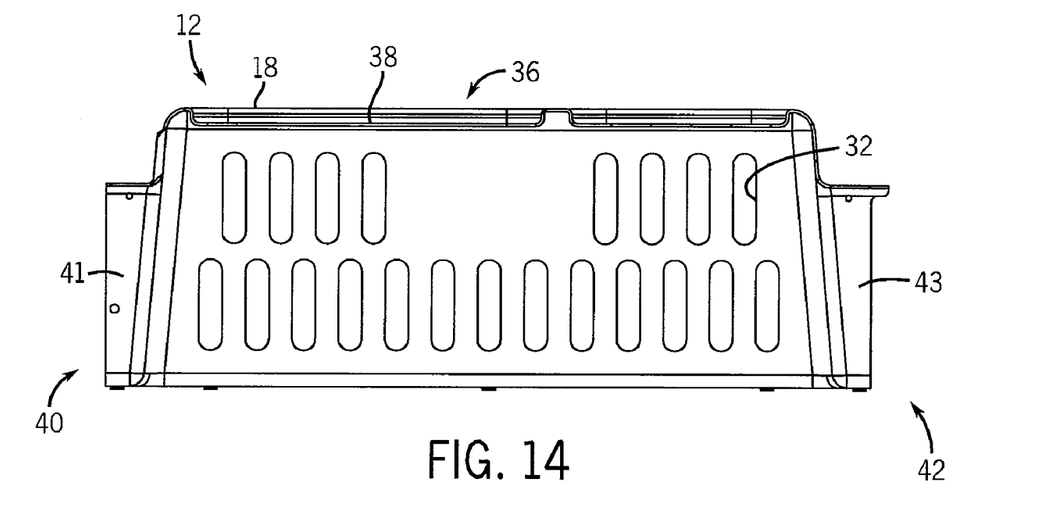
FIG. 14 is a side elevation view of the top shell of FIG. 13.
Figure 15:
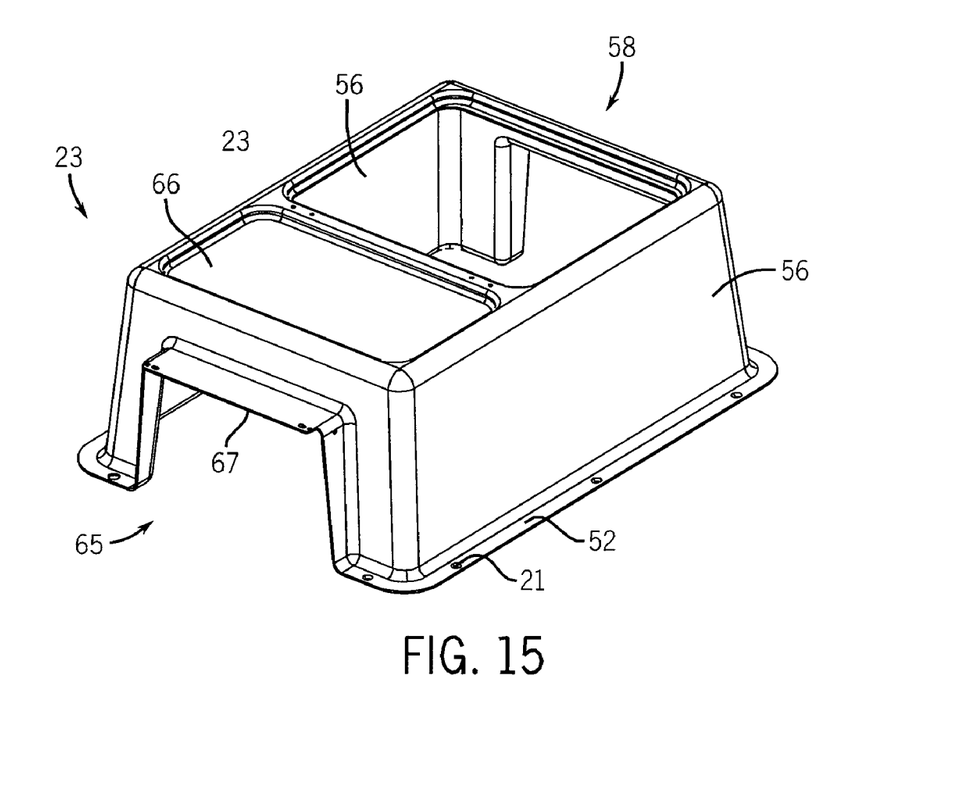
FIG. 15 is a perspective view of a top shell of a rear compartment of the pet training system showing a top door removed therefrom.
Figure 16:
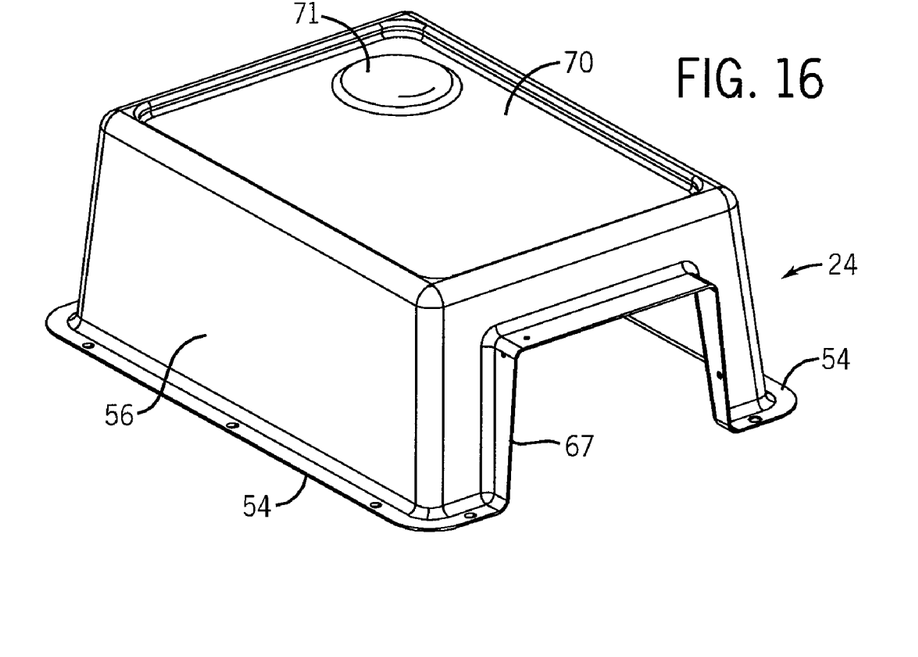
FIG. 16 is a perspective view of a bottom shell of a rear compartment, showing an underside thereof.
Figure 17:
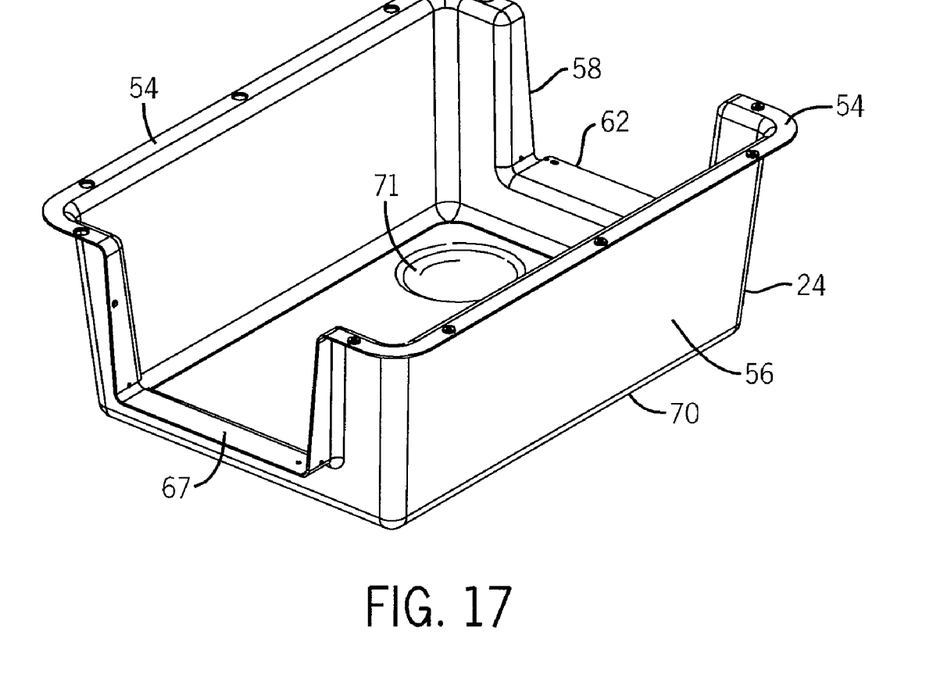
FIG. 17 is a perspective view of the bottom shell of FIG. 16 showing a top side thereof.
Figure 18:
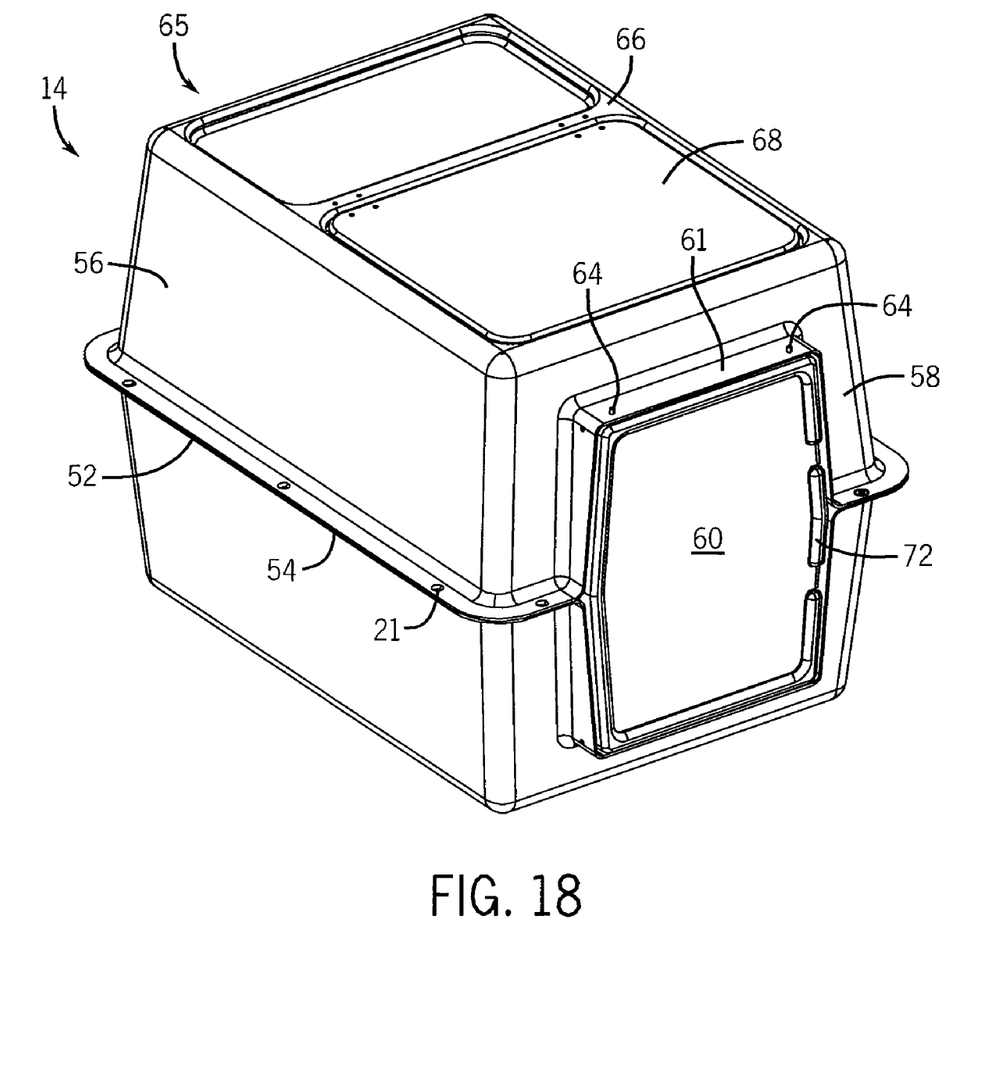
FIG. 18 is an end elevation view of the rear compartment of the pet training system of the present invention.

Referring now to the drawings, and initially to FIG. 1, a representative embodiment of the present invention is shown as a pet training system 10, including a front compartment 12 and a rear compartment 14 joined by a passage door 16. Front compartment 12 comprises a top shell 18 and bottom shell 20 coupled to one another by fasteners 22 through holes 21 provided therein. Likewise, rear compartment 14 comprises a top shell 23 and bottom shell 24 coupled to one another by fasteners 22. Top shell 18 and bottom shell 20 include outwardly extending flanged surfaces 26 and 28 respectively on each side thereof. Referring briefly to FIGS. 2 and 3, flanged surfaces 26 and 28 each include a plurality of holes for receiving fasteners 22. Fasteners 22 may be any type of fastener but are preferably threaded screws configured to be threadably inserted through holes in flanged surfaces 26 and 28. As such, the holes in flanged surfaces 26 and 28 are preferably threaded to receive fasteners 22. Flanged surfaces 26 and 28 are configured to align with one another such that fasteners 22 can be inserted through holes 21 therein for securing the top shell 18 to the bottom shell 20.

Referring now to FIGS. 1 and 4-14, top shell 18 and bottom shell 20 comprise substantially mirrored structures such that they form front compartment 12 when joined together by fasteners 22. Accordingly, front compartment 12 comprises a pair of sides 30. Sides 30 preferably include a plurality of apertures 32 therein for venting of the front compartment 12. Alternatively, only one of sides 30 may include apertures 32 to thereby minimize air movement and air draft for the caged pet while still allowing for some venting. Including apertures on only one of sides 30 minimizes the amount of dust from litter boxes entering the surrounding area. Preferably, side 30 without the apertures would be positioned adjacent to or abutting a wall. The apertures 32 may be modified to accommodate particular applications. For example, the apertures 32 may be shaped in an aesthetically pleasing manner or for different uses. Front compartment 12 further comprises a top 36 having a door 38 hingedly coupled thereto. Door 38 is selectively openable by a user of the pet training system 10 of the present invention to reach into the front compartment 12 of the system 10. In a preferred embodiment of the invention, door 38 includes a plurality of apertures for venting the front compartment 12.

Front compartment 12 further includes a front 40 and back 42. Front 40 includes a forward extending portion 41 for defining a doorway and configured to receive a front door 44. Front door 44 preferably includes a plurality of apertures for venting the front compartment 12. Front 40 preferably includes a plurality of pin receivers 46 for receiving pins 48 therethrough for coupling the front door 44 to the front 40 of the front compartment 12. In operation, a user of system 10 of the present invention may selectively open the front door 44 by removing the pins 48 on one side of front 40 and hingedly swinging the front door 44 about a vertical axis defined by the pins on the other side of the door 44. Also, a user of the system 10 may remove the pins 48 from both sides of the front door 44 to remove the front door 44 completely after the pet completes the training period. Front door 44 may include a handle 45 for grasping by a user to swing front door 44 open. Further, after completion of the training period the front door 44 may optionally be replaced with a flapper-type door of the kind generally known in the art. Front 40 further includes a carrying handle 47 for grasping by a user such that the user may easily carry pet training system 10. Back 42 of front compartment 12 is substantially similar to front 40 and includes a cutout portion for defining passage door 16 in combination with a front of rear compartment 14 as will be described in detail herein. Back 42 includes a rearwardly extending portion 43 configured to cooperate with a portion of rear compartment 14 to define passage 16, as will also be explained further herein.

Front compartment 12 further includes a bottom 49 that is generally solid and adapted to support the weight of the pet to be housed within the system 10 of the present invention. Bottom 49 defines an upwardly facing floor 50 that may be covered with an anti-tracking material to minimize the amount of debris tracked out of the system 10 on the pet's paws. Such anti-tracking material may comprise a special matting or flooring formed from plastic or rubber upraised from floor 50. It is generally understood in the art that a number of different materials may be used for creating the anti-tracking material. In addition, floor 50 includes a circular depression 51 for receiving a water or food dish for the pet. In one embodiment of the present invention, the front compartment 12 may include a built-in food and water dispenser. For example, the front compartment 12 may include attached food and water bowls positioned in the front corners of the front compartment 12.

Referring now to FIGS. 1, 4, and 15-18, The construction of rear compartment 14 essentially mirrors that of front compartment 12 as rear compartment 14 is comprised of top shell 23 and bottom shell 24 coupled to one another by way of a plurality of fasteners 22 as described with respect to front compartment 12. As such, top shell 23 and bottom shell 24 further include outwardly extending flanges 52 and 54, respectively. Flanges 52 and 54 further include a plurality of holes 21 therein for receiving fasteners 22 so as to secure the top shell 23 to the bottom shell 24.

Rear compartment 14 further comprises a pair of sides 56 preferably in having a generally solid construction, i.e., devoid of any apertures. Rear compartment 14 further comprises a back 58 having a rearwardly extending portion 61 configured to receive a rear door 60 for system 10. Back 58 preferably includes a plurality of pin receivers 62 for receiving pins 64 therethrough. As such, rear door 60 is hingedly openable about a vertical axis by removing the pins 64 from one side of back 58. Rear door 60 further includes a handle 72 for grasping by a user to open rear door 60. In addition, rear compartment 14 comprises a top 66 having a door 68 hingedly attached to a surface thereof. Door 68 is configured to be selectively openable such that the user of system 10 of the present invention may reach into the rear compartment 14 therethrough. Also, rear compartment 14 includes a substantially solid bottom 70 configured to support the weight of the pet intended to occupy the system 10. In addition, an upwardly-facing floor of bottom 70 is configured to hold, for example, a litter box for the pet. The floor of bottom 70 also preferably includes a circular depression 71 for holding a food or water dish or alternatively a litter box or other container.

Figure 19:
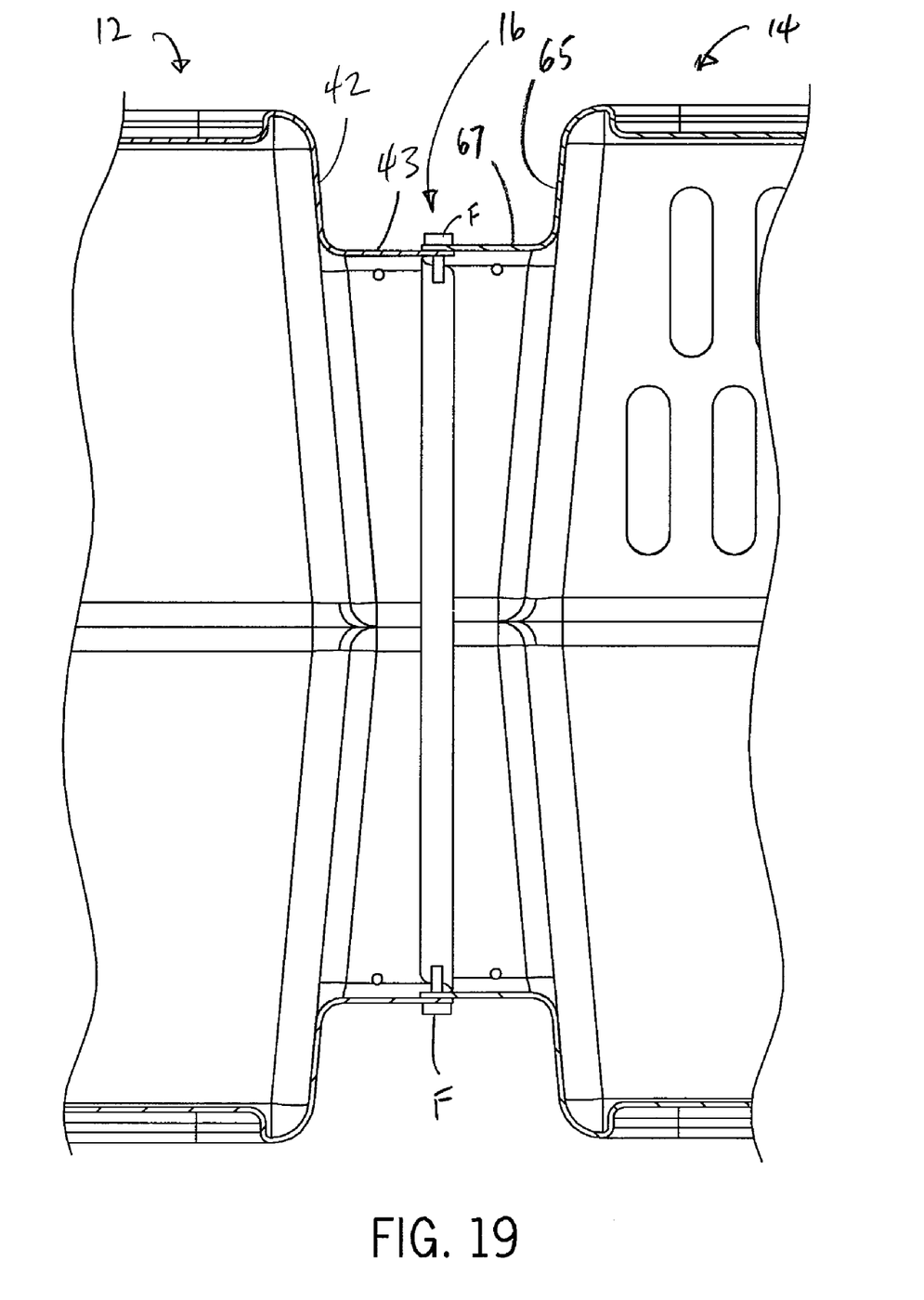
FIG. 19 is a partial section view of the assembled compartments, with general reference to line at 19-19 of FIG. 1.

Rear compartment 14 further comprises a front 65 having a forward extending portion 67 configured to define passage door 16 in combination with the rearwardly extending portion 43 of back 42 of front compartment 12. Forward extending portion 67 and rearwardly extending portion 43 may include a number of apertures therethrough for receiving pins or other such fasteners F (FIG. 19) for securing front compartment 12 and rear compartment 14 to one another to define passage door 16 therebetween. It is understood that any number of coupling arrangements may be utilized in practicing the present invention. In a preferred embodiment, forward extending portion 67 and rearwardly extending portion 43 include integrally formed and cooperating detents and tabs on surfaces thereof such that they may be coupled directly to one another. The detents and tabs may be provided for on either one of front compartment 12 and rear compartment 14. As such, rearwardly extending portion 43 and forward extending portion 67 are configured to overlap one another such that fasteners may be inserted through apertures therein. Accordingly, a restricted passage door 16 is defined between front compartment 12 and rear compartment 14 such that the pet may easily move between front compartment 12 and rear compartment 14. This feature of the present invention is illustrated in detail in FIG. 19.

Alternatively, passage door 16 may comprise a separate divider (not shown) coupled between front compartment 12 and rear compartment 14 by way of pins (not shown) or other such fasteners received through a plurality of pin receivers (not shown). The pins may be quick-release pins configured for relatively quick disassembly of the system 10 such that the front compartment 12 and rear compartment 14 may be easily separated and moved as desired. The divider of this embodiment serves to define a passageway between the front compartment 12 and rear compartment 14 for the pet occupying the system of the present invention, and also functions to secure front compartment 12 and rear compartment 14 together. As such, the divider comprises a generally rectangular shape having an aperture through the center. The aperture through the center of divider is generally large enough to accommodate the passage of the pet housed in system 10. In one embodiment, a divider curtain (not shown) may additionally be provided for temporarily limiting access to one of the front compartment 12 and the rear compartment 14.

The system 10 of the present invention is preferably composed of a substantially durable material such as, for example, polypropylene or polyethylene. However, any other suitable material may be used in construction of the system 10 of the present invention.

Further, the front compartment 12 and rear compartment 14 of the system 10 are preferably shaped to fit snugly in a corner of a room or against a wall. The front compartment 12 and rear compartment 14 of the system 10 of the present invention may be provided in different sizes to accommodate pets of varying size.

The front compartment 12 and rear compartment 14 may additionally include a special litter control rug. The litter control rug preferably includes a tacky coating or may be constructed from a special material configured to prevent the pet from tracking litter from inside the system 10 to the surrounding environment. The rug is preferably specially fitted for placement within the sleeping area of the front compartment 12 or outside the front door 44 thereof. Alternatively, the floor of the front compartment 12 may be constructed of the specialized material for preventing the tracking of litter and/or food into the surrounding area.

Further, the system 10 of the present invention may include an odor control option. For example, system 10 may include air fresheners integral with front compartment 12 and/or rear compartment 14. Alternatively, system 10 may include a holder or other such mechanism for holding an air freshener or air freshener refill such that the air freshener may be changed at regular intervals to ensure that the system 10 remains odor-free.

In addition, the system 10 may include a variety of reward system characteristics configured to encourage the training of the pet. That is, system 10 may include a mechanism for delivering a toy and/or treat to a pet once the pet has properly utilized rear compartment 14 for elimination of urinary and/or fecal matter. Alternatively, system 10 may include audible or visual means for encouraging the pet to utilize rear compartment 14 in the manner intended by the present invention.

A timed door lock may also be included on the system 10 of the present invention. The timed door lock may allow for selective ingress and egress of a pet housed in system 10 while additionally ensuring that the pet is housed within system 10 as required by the owner. As such, the pet owner may select a particular door locking schedule that accommodates the owner's and/or the pet's schedule.

A waste removal bag system may additionally be provided in the system 10 of the present invention. Optionally, the waste removal bag system may be integrally supported within rear compartment 14 such that an owner wishing to remove waste therefrom may simply reach into rear compartment 14 through either top door 68 or rear door 60 to retrieve a waste removal bag for dumping the pet's litter box and/or other waste material.

In operation, system 10 of the present invention provides a system for housing a pet for an extended period of time wherein the pet may be trained to utilize the rear compartment 14 for urinary or fecal elimination during the course of the housing. As noted previously, rear compartment 14 may further include a litter box for use by the pet. Door 68 may be utilized by the pet owner to remove the animal waste, change the litter box, or otherwise clean the rear compartment 14.

Front compartment 12 is preferably used by the pet for all other activities, i.e., sleeping, eating or drinking. Door 38 provided on the top 36 of front compartment 12 may be utilized by the pet owner to remove or fill the pet's water or food dish or otherwise clean the front compartment 12.

In another embodiment of the present invention, when desired by the user, the multi-compartment system 10 of the present invention may be modified to accommodate a particular location. That is, the front compartment 12 and rear compartment 14 may be assembled in a variety of configurations such that the owner may move the living quarters from the front compartment 12 to the rear compartment 14 by simply detaching the front compartment 12 from the rear compartment 14 and attaching it to the rear of the rear compartment 14 such that the front compartment 12 now serves as the rear compartment.

The top shell 18 and bottom shell 20 of front compartment 12 and the top shell 23 and bottom shell 24 of rear compartment 14 are preferably designed to be nestable. Accordingly, the components of system 10 may be nested for efficient shipping.

It has been found that the system of the present invention can be used for cats and dogs, and may also be usable for other types of domestic pets. The system is advantageously employed when the pet is infantile, such that the pet can be trained as to the functions of the multi-compartment system from the beginning. In the case of a dog, this provides the pet with an alternative to outdoors when the pet experiences the urge to eliminate waste. The owners can be absent for an extended period of time, without having to worry whether the pet will "have an accident" or otherwise be in distress. The pet is restful, happy and content while the owners are away, and the owners can have peace of mind knowing that the pet's basic needs are being accommodated. Further, when at home, the owners do not have to go out in bad weather to allow the pet to eliminate waste, but instead, the owners simply allow the pet to use rear compartment 14.

Although the best mode contemplated by the inventors of carrying out the present invention is disclosed above, practice of the present invention is not limited thereto. It is further contemplated that various additions, modifications and rearrangements of the features of the present invention may be made without deviating from the spirit and scope of the underlying inventive concept.

The invention claimed is:

1. A multi-compartment pet training system comprising:
   a front compartment defining an interior and first and second spaced apart front compartment openings, wherein the front compartment comprises an upper section and a lower section that are secured together, wherein the upper and lower sections of the front compartment cooperate to define the first and second front compartment openings;
   a rear compartment defining an interior and first and second spaced apart rear compartment openings, wherein the rear compartment comprises an upper section and a lower section that are secured together, wherein the upper and lower sections of the rear compartment cooperate to define the first and second rear compartment openings;
   a front closure member coupled to the front compartment at the first front compartment opening; and
   a rear closure member coupled to the rear compartment at the second rear compartment opening;
   wherein the front compartment and the rear compartment are secured together by securing the front compartment to the rear compartment at the second front compartment opening and the first rear compartment opening, wherein the second front compartment opening and the first rear compartment opening cooperate to define an intermediate passage that establishes communication between the front compartment and the rear compartment, wherein the intermediate passage enables a pet a move from the interior of the front compartment to the interior of the rear compartment and vice versa.

2. The multi-compartment pet training system of claim 1, wherein the second front compartment opening is defined by flange structure extending outwardly from a wall associated with each of the upper and lower sections of the front compartment, and wherein the first rear compartment opening is defined by flange structure extending outwardly from a wall associated with each of the upper and lower sections of the rear compartment, and wherein the flange structure of the upper and lower sections of the front and rear compartments, respectively, are coupled to one another to define the intermediate passage.

3. The multi-compartment pet training system of claim 1 wherein the front compartment is adapted to serve as a sleeping and eating area for a crated pet and the rear compartment is configured to serve as a waste elimination area for the crated pet.

4. The multi-compartment pet training system of claim 1 wherein the rear closure member comprises a door hingedly secured to the rear compartment at the second opening of the rear compartment, wherein the door allows a user to selectively access the interior of the rear compartment.

5. The multi-compartment pet training system of claim 1 wherein the upper section of the front compartment includes at least one side with a plurality of apertures for venting the front compartment.

6. The multi-compartment pet training system of claim 1 further comprising a top door hingedly coupled to the front compartment to allow a user to selectively access the interior of the front compartment.

7. The multi-compartment pet training system of claim 1, wherein the first and second openings of both the front compartment and the rear compartment are identically configured.

8. The multi-compartment pet training system of claim 7, wherein the upper and lower sections of the front compartment and rear compartment are coupled to one another by way of at least one fastener.

9. The multi-compartment pet training system of claim 8, wherein upper and lower sections of the front compartment and rear compartment have outwardly extending flanged surfaces that are configured to cooperate with one another to accept the at least one fastener therethrough for coupling the upper and lower sections to one another.

10. The multi-compartment pet training system of claim 1, wherein the front closure member comprises a door that is hingedly coupled to the front compartment at the first opening of the front compartment.

11. The multi-compartment pet training system of claim 10, wherein the front door is secured to the front compartment by at least one pin.

12. The multi-compartment pet training system of claim 1, wherein a floor of the front compartment includes means for preventing the pet from tracking debris outside of the system.

13. The multi-compartment pet training system of claim 1, wherein the rear compartment includes a deodorizing means releasably secured therein for eliminating odors therein.

* * * * *